(12) United States Patent
Isobe et al.

(10) Patent No.: US 6,970,974 B2
(45) Date of Patent: Nov. 29, 2005

(54) METHOD FOR MANAGING DISK DRIVES OF DIFFERENT TYPES IN DISK ARRAY DEVICE

(75) Inventors: Daisuke Isobe, Odawara (JP); Azuma Kano, Odawara (JP); Akihisa Hirasawa, Oadawara (JP); Shingo Itagaki, Ninomiya (JP); Kenichi Tateyama, Odawara (JP); Yoshinori Nagaiwa, Ninomiya (JP); Nobuhiro Takahashi, Hadano (JP)

(73) Assignee: Hitachi, Ltd., Tokyo (JP)

( * ) Notice: Subject to any disclaimer, the term of this patent is extended or adjusted under 35 U.S.C. 154(b) by 64 days.

(21) Appl. No.: 10/808,364

(22) Filed: Mar. 25, 2004

(65) Prior Publication Data

US 2005/0177683 A1     Aug. 11, 2005

(30) Foreign Application Priority Data

Feb. 9, 2004   (JP) .............................. 2004-031507

(51) Int. Cl.⁷ ............................................ G06F 12/00
(52) U.S. Cl. ...................................... 711/114; 710/10
(58) Field of Search ................. 711/114, 162; 710/10, 710/15, 16

(56) References Cited

U.S. PATENT DOCUMENTS

| | | |
|---|---|---|
| 5,617,425 A | 4/1997 | Anderson |
| 6,829,658 B2 | 12/2004 | Beauchamp et al. |
| 2003/0135577 A1 | 7/2003 | Weber et al. |
| 2004/0162940 A1 | 8/2004 | Yagisawa et al. |
| 2005/0071525 A1 | 3/2005 | Yagisawa et al. |
| 2005/0097132 A1 * | 5/2005 | Cochran et al. ......... 707/104.1 |

* cited by examiner

Primary Examiner—Hiep T. Nguyen
(74) Attorney, Agent, or Firm—Reed Smith LLP; Stanley P. Fisher, Esq.; Juan Carlos A. Marquez, Esq.

(57) ABSTRACT

The present invention manages disk-drive types in a storage device in which a mixture of disk drives of a plurality of types with different interfaces is stored. The storage device enclosure stores a mixture of an FC disk drive 220F with a fiber channel interface and a SATA disk drive with a serial interface. The SATA disk drive is connected to a fiber channel via an FC/SATA interface connection device 233 that performs interface conversion. At startup and so forth, the controller 310 issues an inquiry to the enclosure management unit or to each of the disk drives and, based on the address allocated to each of the disk drives, or similar, automatically confirms the type of each disk drive and manages the confirmation results.

22 Claims, 15 Drawing Sheets

METHOD FOR MANAGING DISK DRIVES OF DIFFERENT TYPES IN DISK ARRAY DEVICE

CROSS-REFERENCES TO RELATED APPLICATIONS

This application relates to and claims priority from Japanese Patent Application No. 2004-031507, filed on Feb. 9, 2004, the entire disclosure of which is incorporated herein by reference.

BACKGROUND OF THE INVENTION

1. Field of the Invention

The present invention relates to a disk array device that comprises a mixture of disk drives of a plurality of types with different interfaces, and, more particularly, to a method for managing the disk drives of different types in this disk array device.

2. Description of the Related Art

Disk drives used in disk array devices have a variety of interfaces and characteristics. For example, a disk drive, which reads and writes data by means of a fiber channel interface (hereinafter referred to as a 'fiber channel disk drive' or an 'FC disk drive'), is afforded dual paths in order to be accessible by a plurality of controllers, and possesses characteristics such as a fast read/write speed.

As a different type of disk drive, a disk drive that reads and writes data by means of a serial interface (referred to hereinafter as a 'serial disk drive' or 'SATA disk drive') is a serial-port disk drive. Further, although the read/write speed is comparatively slow, this type of disk drive is characterized by its relatively low cost and large capacity. In recent years, technologies for employing SATA disk drives by affording same dual paths in order to improve fault tolerance have been proposed (see U.S. Patent Application Laid Open No. 2003/135577/specification). According to this technology, each SATA disk drive is connected to a fiber channel via a converter that converts the serial interface into a fiber-channel interface, and a dual port device that provides the SATA disk drive with dual paths.

SUMMARY OF THE INVENTION

Conventionally, disk drives of any one type have been used uniformly in disk array devices. Therefore, the controller is unable to identify the type of disk drive and cannot operate in accordance with the disk-drive type, meaning that the disk drive cannot be used properly according to the data content and application, and so forth. With this situation in mind, it is an object of the present invention to provide a technology that allows a controller to identify the type of each disk drive in a straightforward manner.

The present invention is directed toward a disk array device in the enclosure of which a plurality of disk drives and a controller that controls the reading and writing of data from and to the disk drives are stored and mutually connected by means of a fiber channel cable. Disk drives include two types of disk drive, which are a fiber channel disk drive with a fiber channel, or an FC disk drive, and a serial disk drive with a serial interface, or a SATA disk drive. The serial disk drive is connected to a fiber channel cable via an interface connection device for converting the serial interface into a fiber channel interface. In this disk array device, according to the present invention, the controller discriminates the type of each disk drive by communicating via the fiber channel cable. The controller is thus able to automatically discriminate and manage the type of each disk drive without awaiting settings by the user. False judgments regarding the type of each disk drive can thus be suppressed and suitable management can be implemented.

The present invention may comprise a plurality of controllers and may be applied to a dual-path disk array device. With such a constitution, the controllers are mutually connected by means of a fiber channel cable and connected to each of the disk drives individually to form a plurality of fiber channel loops. Each serial disk drive is connected to each fiber channel cable via a switch that switches the connection destination between the plurality of fiber channel cables. With this constitution, each controller may individually discriminate the type of each disk drive and another controller may utilize the result discriminated by any one controller.

A structure is sometimes adopted for a disk array device in which a predetermined number of disk drives are stored in a disk array device enclosure after being housed in disk drive enclosures. In this case, the type of the disk drives may be standardized for each disk drive enclosure or disk drives of different types may be mixed within a disk drive enclosure.

When the type of disk drive is standardized within a disk drive enclosure, a disk drive enclosure for storing at least a serial disk drive is preferably provided with a management unit for managing the operating states of each stored disk drive. When this management unit is provided, the controller is able to discriminate the disk-drive type by communicating with the management unit.

When the type of disk drive in a disk drive enclosure is standardized, an address may be allocated to each of the disk drives according to a certain rule corresponding with each disk-drive type, in each disk drive enclosure. In this case, the controller is able to discriminate the type on the basis of the address allocated to each of the disk drives. As a method of address allocation, the address space may be changed in accordance with the type, for example. Further, the relationship between the location of the disk drive within the disk drive enclosure and the address allocated to each of the disk drives may be changed. Possible examples of the latter embodiment include an embodiment in which addresses are allocated in ascending order to disk drives arranged in a column in the case of FC disks and addresses are allocated in descending order in the case of SATA disk drives. An opposite relationship is also possible.

The controller may discriminate the type of disk drive by means of the following method. A backboard, on which a plurality of connectors for connecting a plurality of disk drives is arranged, is provided in the disk array device, and at least one of the position and shape of the plurality of connectors may be changed in accordance with the type of disk drive. The controller is thus able to discriminate disk-drive type on the basis of the connector to which a disk drive is connected.

In this structure, on the backboard, an interface connection device may be connected to the connector to which the serial disk drive is to be connected. In this case, a connection to a fiber channel can be made easily simply by connecting the serial disk drive to the connector.

The method for discriminating the type based on the connector can be applied both to a case where the type of disk drive in the disk drive enclosure is standardized and to a case where different types of disk drive are mixed together. When the type discrimination method is applied to the former case, the controller is able to perform discrimination as long as at least one connector is used for each disk drive enclosure. In the latter case, discrimination may be performed based on the connector for each of the disk drives.

In the case of the disk array device of the present invention, racks with standardized outer dimensions may be used to house each disk drive. Each disk drive is stored in the disk drive enclosure in a state where the disk drive is housed in a rack. There is therefore the advantage that, even when the outer dimensions vary between different types of disk drive, handling is straightforward on account of the standardized size of each disk drive when same are housed in the racks. Further, an interface connection device is preferably built into the rack for storing the serial disk drive. Thus, there is also the advantage that handling is straightforward because the external interface of the rack can be standardized with respect to the fiber channel.

Such a rack may be provided with a mechanism for reliably holding the disk drive, and a mechanism for preventing the erroneous insertion of a disk drive of a different type. As the former mechanism, position-regulating holes may be provided in uniform positions in all the types of disk drive and tapered position-regulating pins may be provided within the rack in positions that correspond with the position-regulating holes. The disk drive can thus be held without difficulty. As the latter mechanism, holes serving to prevent erroneous-insertion may be provided in only one of the fiber channel disk drive and the serial disk drive, and pins may be provided within the rack in correspondence with these erroneous-insertion-preventing holes. It is thus possible to prevent insertion of a disk drive in which these erroneous-insertion-preventing holes corresponding with the pins have not been made. The position-regulating pins and erroneous-insertion-preventing pins may both be provided and used together. For example, by varying the positions of the position-regulating pins and holes in accordance with the disk-drive type, both the functions of position regulation and erroneous insertion prevention can be afforded.

The present invention may be constituted not only as the disk array device above but also as a method for managing the disk drives in a disk array device. The present invention may also take the form of a computer program for implementing disk-drive management, or as a computer-readable recording medium on which this computer program is recorded. As possible recording media, a variety of computer-readable media such as flexible disks, CD-ROMS, magneto-optical disks, IC cards, ROM cartridges, punch cards, printing matter printed with symbols such as barcodes, computer internal-storage devices (memory such as RAM, ROM, and so forth), and external storage devices, can be utilized.

DESCRIPTION OF THE PREFERRED EMBODIMENTS

Embodiments of the present invention will be described in the following order:

A. First embodiment:
  A1. System constitution:
  A2. Disk type management processing:
  A3. Modified example:
B. Second embodiment:
C. Modified example:

A. First Embodiment

Figure 1:
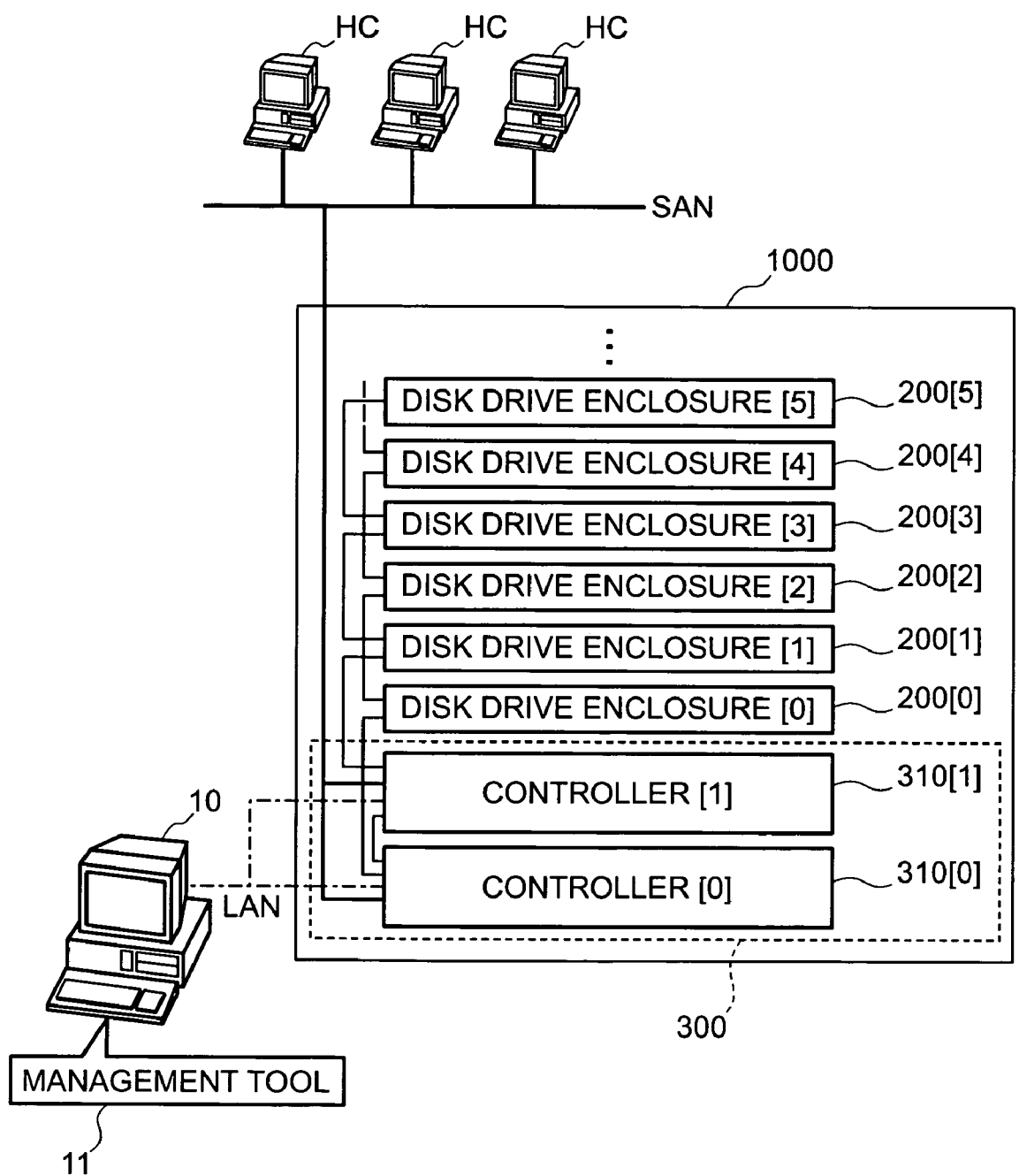
FIG. 1 is an explanatory view of the outline constitution of an information processing system constituting an embodiment.

A1. System Constitution:

FIG. 1 is an explanatory view of the outline constitution of an information processing system constituting an embodiment. The information processing system is constituted by connecting a storage device 1000 and host computers HC by means of a SAN (Storage Area Network). Each computer HC is capable of implementing various information processing by accessing the storage device 1000. A management device 10 is connected to a local area network LAN. A general-purpose personal computer with a network communication function, or the like, can be used as the management device 10, and a management tool 11, that is, an application program for setting the operation of the storage device 1000 and monitoring the operating state of the storage device 1000, is installed on the management device 10.

Within the storage device 1000, a plurality of disk drive enclosures 200 and a controller 300 are housed in a storage device enclosure. As will be mentioned subsequently, the disk drive enclosures 200 contain a multiplicity of disk drives (hereinafter known as 'HDD'). For the disk drives, general-purpose 3.5-inch disk drives, as adopted by personal computers and so forth, can be used. The controller enclosure 300 houses a controller 310 for controlling the reading and writing of data from and to the disk drive. In this embodiment, a dual-controller-type controller, which houses two controllers, is applied. The controller 310 exchanges data with the host computers HC via the SAN and is capable of exchanging data with the management device 10 via the LAN. The controller enclosure 300 and each disk drive enclosure 200 are mutually connected at the rear by means of fiber channel cables (hereinafter known as an 'ENC (Enclosure) cable').

Although not illustrated, an AC/DC power supply, a cooling fan unit, and a battery unit are also provided in the storage device enclosure. The battery unit has a built-in secondary cell and functions as a backup power supply that supplies electric power during a power outage.

Figure 2:
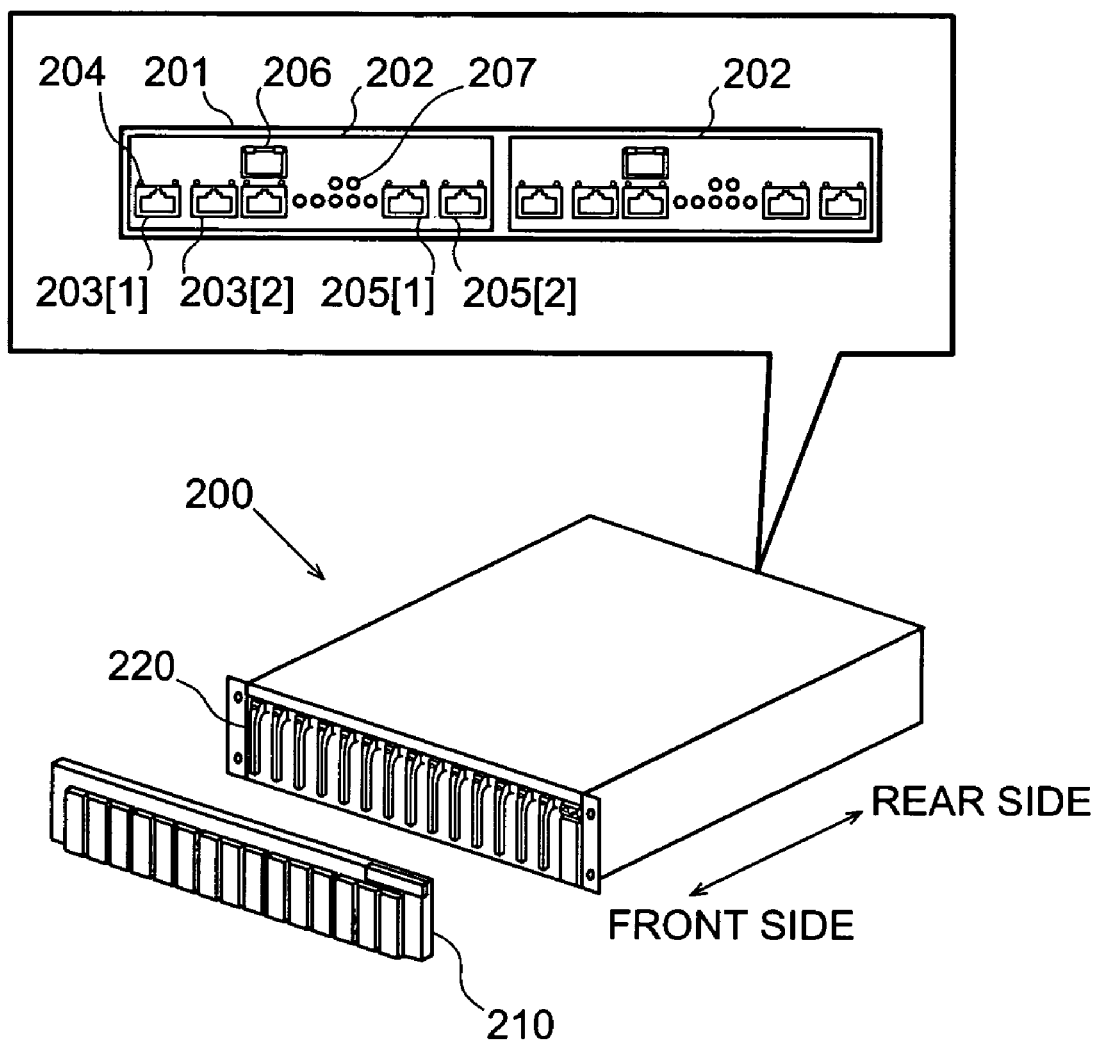
FIG. 2 is a perspective view of a disk drive enclosure 200.

FIG. 2 is a perspective view of the disk drive enclosure 200. The disk drive enclosure 200 has a louver 210 mounted on the front side thereof, and a plurality of disk drives 220 arranged therein. Each disk drive 220 can be dismounted and exchanged by being pulled out from the front of the disk drive enclosure 200. At the top of FIG. 2, a rear-side connection panel is shown. In this embodiment, the disk drives 220 are stored divided between two ENC (Enclosure) units 202. Each ENC unit is provided with two of each of an ENC-cable IN connector 203 and an OUT connector 205. Because two ENC units 202 are stored, the disk drive enclosure 200 is provided with a total of four IN connectors 203 and OUT connectors 205, that is, connectors corresponding with four paths (hereinafter also referred to as 'FC-AL loops'). LEDs 204 are provided above each connector. However, in order to avoid making the illustration complicated, the symbol for an LED 204 is only appended to the connector 203 [1]. The ENC unit 202 may be provided with a LAN connector 206 for connecting a LAN cable and an LED 207 to indicate the communication state.

Figure 3:
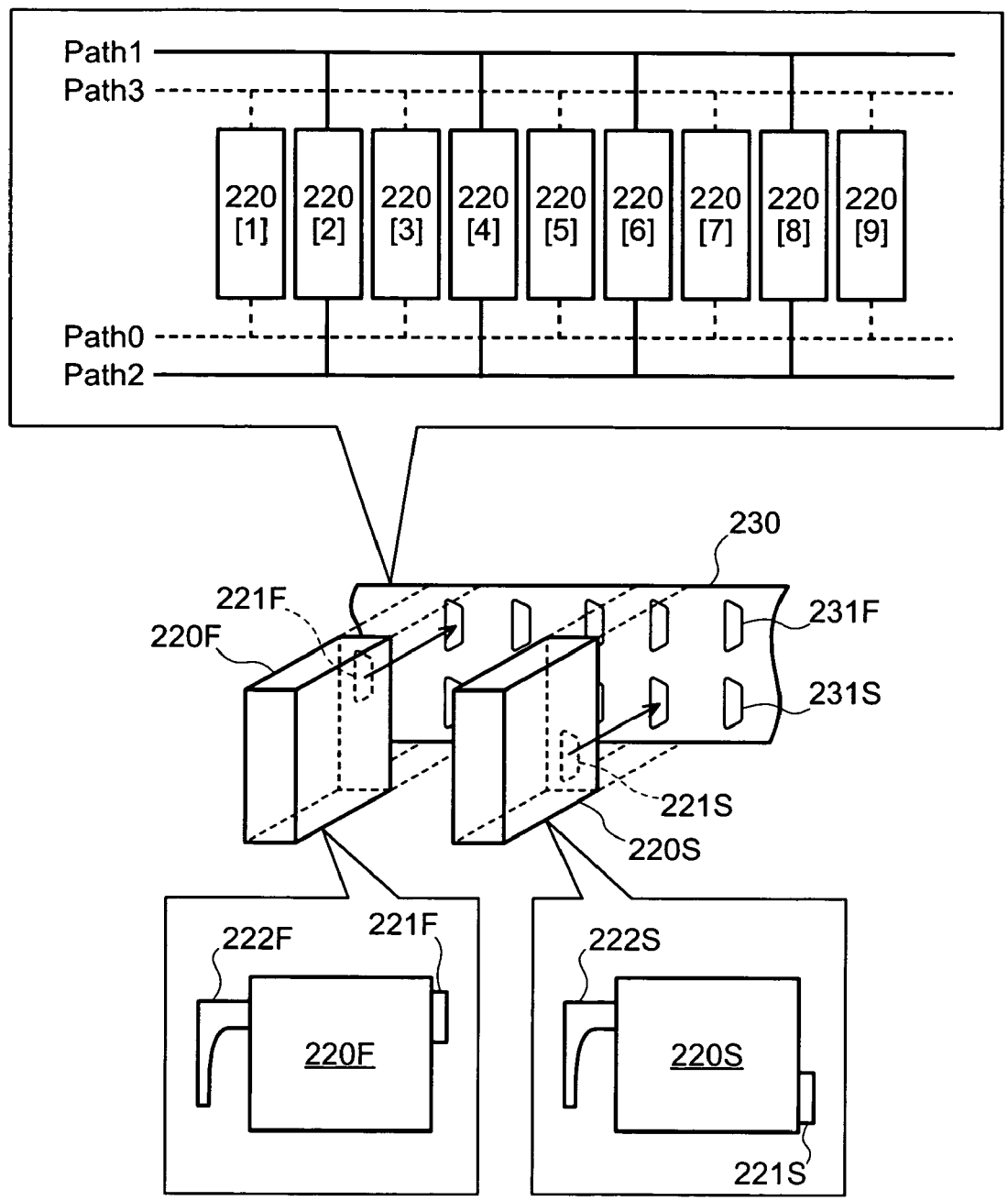
FIG. 3 is an explanatory view that schematically shows the internal structure of the disk drive enclosure 200.

FIG. 3 is an explanatory view that schematically shows the internal structure of the disk drive enclosure 200. In this embodiment, disk drives 220 with two types of interfaces can be used. One of these types is a disk drive 200F with a fiber channel interface (hereinafter referred to as an 'FC disk drive'), and the other is a disk drive 220S with a serial interface (hereinafter called a 'SATA disk drive'). The circuit constitution for permitting the combined application of different interfaces will be described subsequently. Hereinafter, references simply to the 'disk drive 220' signify a general term with no relation to the type of interface, but 'FC disk drive 220F' and 'SATA disk drive 220S' are used when disk drives are distinguished for each interface.

The two types of disk drive possess the following characteristics. The FC disk drive 220F has dual ports and thus permits reading and writing via two paths, and is also equipped with SES (SCSI Enclosure Service) and ESI (Enclosure Service I/F) functions as prescribed by the SCSI3 (Small Computer System Interface 3) standard. SES is a software specification that monitors the operating status of a variety of elements installed in the disk drive enclosure 200, such as the power supply, cooling devices, indicators, individual disk drives and switches (enclosure) and is used to read the status. ESI is a hardware interface for exchanging SES commands and results thereof. By employing SES and ESI, the operating status of each disk drive can be identified, for example. In this embodiment, the SATA disk drive 220S is a single-port disk drive without SES and ESI functions. However, the application of a SATA disk drive 220S equipped with these functions cannot be ruled out.

At the bottom of FIG. 3, a side view of each of the disk drives 220F, 220S is provided. Respective handles 222F and 222S, which are used in the mounting and dismounting of the disk drives 220F and 220S into and from the disk drive enclosure 200, and connectors 221F and 221S, are provided. The connectors 221F and 221S are provided in vertically displaced positions with respect to each other.

As shown in the middle of FIG. 3, a backboard 230, on which connectors 231F and 231S for mounting the disk drives 220 are arranged, is attached to the rear side of the disk drive enclosure 200. The connector 231F is for the FC disk drive 220F, and the connector 221S is for the SATA disk drive 220S. The connectors 231F and 231S form a vertical set, being arranged laterally to correspond with the mount positions of the disk drives 220. When each of the disk drives 220F and 220S is inserted for withdrawal from the front of the disk drive enclosure 200, the connectors 221F and 221S of the disk drives are mounted in either of the connectors 231F and 231S of the backboard 230 according to the type. By changing the connectors mounted according to the type of disk drive 220, proper usage of a circuit for compensating for the difference in interface is implemented, as will be described subsequently. Further, the difference between connectors can also be utilized in discriminating the type of each disk drive 220.

When connected to a connector, each disk drive 220 is connected to four paths Path0 to Path 3 of the disk drive enclosure 200. In this embodiment, the constitution is such that disk drives 220 connected to Paths 0 and 3, and disk drives 220 connected to Paths 1 and 2 are arranged alternately. Thus, a dual-path constitution permitting access via two of the four paths is implemented for each of the disk drive 220. The constitution shown in FIG. 3 is merely an example, it being possible to adopt a variety of embodiments for the relationship between the number of paths in the disk drive enclosure 200 and the disk drives 220.

Figure 4:
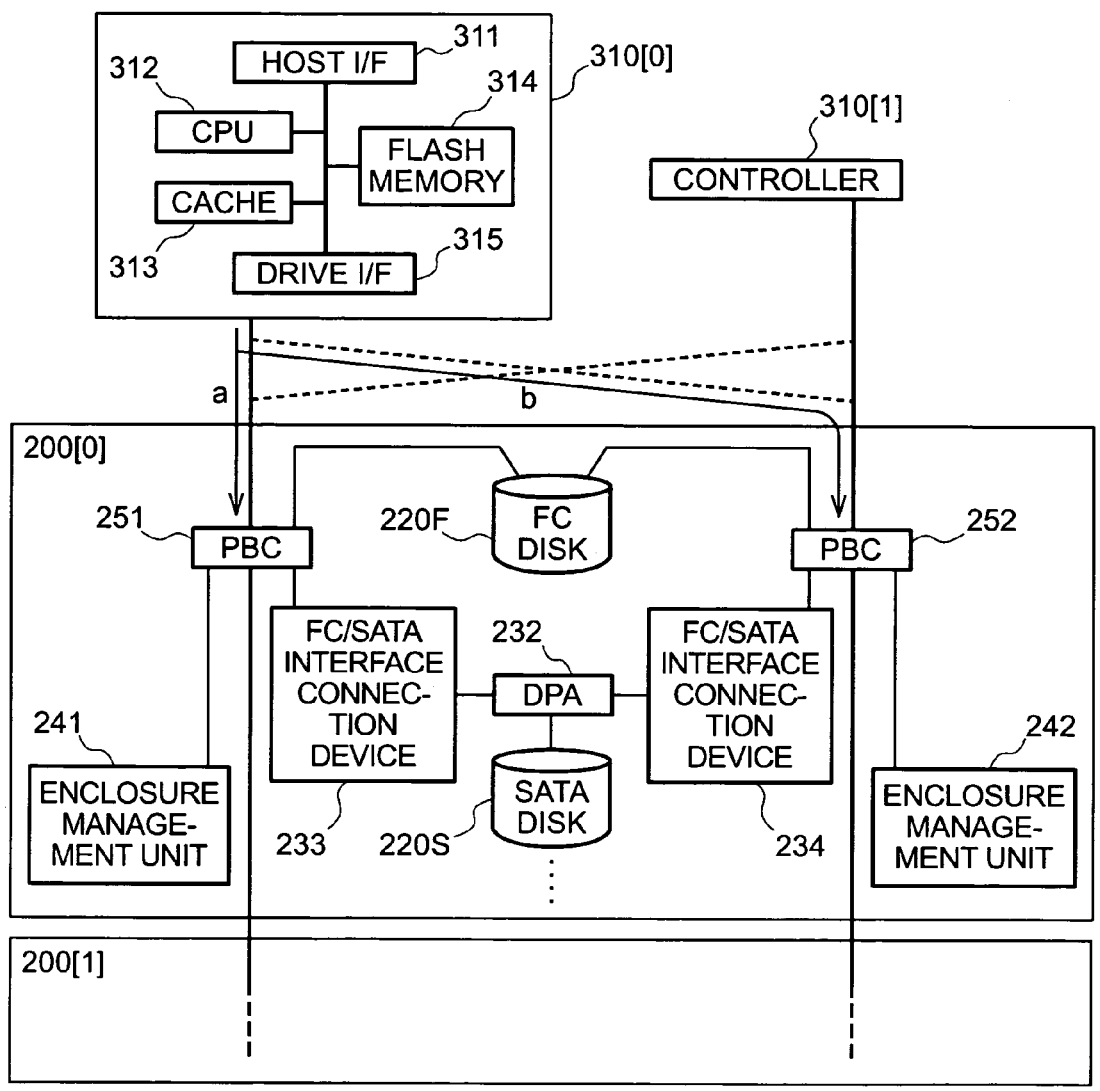
FIG. 4 is an explanatory view that schematically shows the internal structure of a storage device 1000.

FIG. 4 is an explanatory view that schematically shows the internal structure of a storage device 1000. The internal structure of the controller 310 built into the controller enclosure 300 and the internal structure of the disk drive enclosure 200 are shown schematically. The controller 310 is a microcontroller that contains a CPU 312, and memory such as RAM, ROM, and so forth. The controller 310 comprises a host I/F311, which is a communication interface for communicating with a host computer HC, and a drive I/F315, which is a communication interface for communicating with the disk drive enclosure 200. The host I/F 311 provides a communication function, which is prepared according to the fiber channel standard. The drive I/F315 provides a communication function according to the SCSI standard, fiber channel standard, and so forth.

Memory includes a cache memory 313 on which data written to and data read from the disk drive 220 are stored, and FLASH memory 314 for storing various control software, and so forth. Circuits for monitoring the states of the AC/DC power supply, for monitoring the states of the disk drive 220, for controlling a display device on a display panel, and for monitoring the temperature of the each part in the enclosure, are mounted in the controller 310. However, these circuits are not illustrated here.

In this embodiment, the four loops Path 0 to Path 3 shown in FIG. 3 earlier are formed by the two controllers 310[0] and 310[1]. In FIG. 4, in order to avoid a complicated illustration, two loops, which are equivalent to a combination of Paths 0 and 3, or Paths 1 and 2, respectively, are illustrated. Each of the controllers 310[0] and 310[1] is capable of path switching as indicated by the broken lines. Therefore, the controller 310[0] is able to access each disk drive 220 via either of the two loops as indicated by the arrows a and b in FIG. 4, for example. The same is true of the controller 310[1].

As described earlier, a plurality of disk drives 220 is connected to the disk drive enclosure 200. The FC disk drive 220F is connected to two FC-AL loops via the PBC (Port Bypass Circuits) 251 and 252.

On the other hand, the SATA disk drive 220S is connected to two FC-AL loops via a DPA (Dual Port Apparatus) 232, FC/SATA interface connection devices 233, 234, and PBCs 251 and 252. The DPA 232 is a circuit for rendering the single-port SATA disk drive 220S a dual-port disk drive. By using the DPA 232, the SATA disk drive 220S also permits access via either FC-AL loop in the same way as the FC disk drive 220F.

The FC/SATA interface connection devices 233 and 234 are circuits for performing conversion between the serial interface of the SATA disk drive 220S and the fiber channel interface. This conversion includes conversion of the protocol and commands used to access the SATA disk drive 220S, and the SCSI protocol and commands used by a fiber channel, for example.

As described earlier, the FC disk drive 220F is equipped with an SES function, whereas the SATA disk drive 220S is not provided with this function. In order to compensate for this difference, enclosure management units 241 and 242 are provided in the disk drive enclosure 200. The enclosure management units 241 and 242 are microcontrollers that contain a CPU, memory and cache memory, and so forth, and collect the disk type, address, operating state, and other management information from each disk drive 220 in the disk drive enclosure 200. The enclosure management units 241 and 242 are connected to two FC-AL loops via the PBCs 251 and 252, and thus supply this collected information to the controllers 310 in accordance with a SES command from the controllers 310. In this embodiment, the controllers 310 are able to acquire management information by means of a standardized method irrespective of the types of disk drive 220. The enclosure management units 241 and 242 collect management information not only for the SATA disk drive 220S but also for the FC disk drive 220F.

The FBC 251 controls the path/bypass between three devices connected to the FC-AL loops, namely the FC disk drive 220F, the FC/SATA interface connection device 233 and the enclosure management unit 241. Normally, the FBC 251 connects to the same FC-AL loop by selecting one of the FC disk drive 220F, the FC/SATA interface connection device 233 and the enclosure management unit 241 in accordance with a command from the controller 310. Further, when a breakdown occurs, the PBC 252 is able to disconnect the three devices connected to the FC-AL loop, that is, the FC disk drive 220F, the FC/SATA interface connection device 234 and the enclosure management unit 242, from the FC-AL loop.

As a result of the structure described above, the storage device 1000 according to the present embodiment possesses the following characteristics. First, as a result of the functions of the FC/SATA interface connection devices 233 and 234, each disk drive enclosure 200 is able to store a mixture of two types of disk drive such as the FC disk drive 220F and the SATA disk drive 220S. Second, as a result of the functions of the DPA 232, the SATA disk drive 220S can also be implemented as a dual port disk drive. Third, as a result of the functions of the enclosure management units 241 and 242, the controllers 310 are also able to collect management information on the SATA disk drive 220S in a straightforward manner. These characteristics are based on the constitution described in FIGS. 1 to 4 and are not prerequisites of this embodiment. In addition to the storage device 1000 above, this embodiment can be applied to storage devices composed of a variety of structures including a structure that excludes some of the above characteristics.

Figure 5:
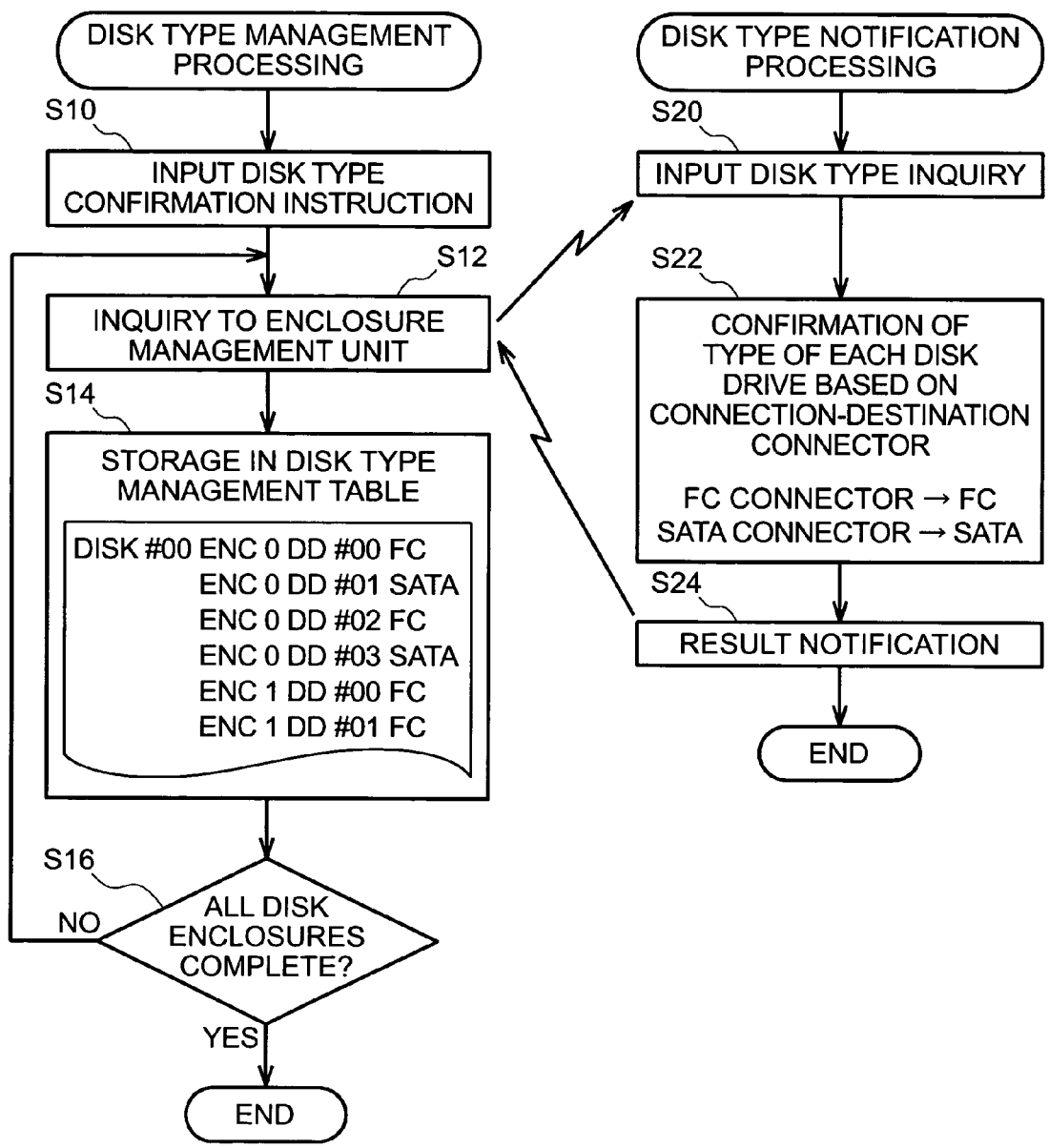
FIG. 5 is a flowchart of disk-type management processing.

A2. Disk Type Management Processing:

FIG. 5 is a flowchart of disk-type management processing. This is processing in which the controller 310 identifies the type of each disk drive 220, that is, whether a disk drive is the FC disk drive 220F, or the SATA disk drive 220S, and the disk types are managed. On the left-hand side, the processing executed by the controller 310 is shown, while the processing executed by the enclosure management units 241 and 242 is shown on the right.

When this processing begins, the controller 310 inputs a disk type confirmation instruction (step S10). The confirmation instruction may be performed explicitly by means of a user operation of the controller 310 or a command from the management device 10, for example, or activation of the storage device 1000 may be regarded as the confirmation instruction. The controller 310 may execute this processing at fixed intervals. In this case, there is the advantage that, when a disk drive 220 is withdrawn and exchanged during maintenance or the like, for example, constitutional modifications can be managed in the absence of an explicit instruction by the user or the like.

In accordance with the confirmation instruction, the controller 310 issues an inquiry to the enclosure management units 241 and 242 with respect to each of the disk drive enclosures 200 regarding the type of disk drive 220 stored in the disk drive enclosures 200. When this inquiry is input (step S20), the enclosure management units 241 and 242 confirm the type (step S22) on the basis of the connector to which each disk drive 220 is connected. That is, the disk drive 220 is identified as an 'FC disk drive' when the disk drive 220 is connected to the connector 231F shown earlier in FIG. 3 and as a 'SATA disk drive' when the disk drive 220 is connected to the connector 231S. The enclosure management units 241 and 242 then report the confirmation result thus obtained to the controller 310 (step S24).

The above processing may be carried out by only one of the enclosure management units 241 and 242 that receives an inquiry from the controller 310. Further, the enclosure management units 241 and 242 may identify and store the disk-drive type in advance and report the results to the controller 310 in accordance with an inquiry.

Upon receiving this report from the enclosure management units 241 and 242, the controller 310 stores these results in a disk type management table (step S14). The disk type management table is a table that stores the types of disk drives 220 in the cache of the controller 310 in order to manage these types. The content of the disk type management table is shown in the drawings. A disk drive 220 is specified by a combination of the number of the disk drive enclosure 200, the number of the ENC unit 202, and a port-specific address. For example, the uppermost record in the illustrated table signifies that the disk drive 220 at address '#00' stored in ENC unit No. '0' in disk drive enclosure No. '#00' is an 'FC disk drive'.

The controller 310 is able to identify the type of each disk drive 220 by repeatedly executing the aforementioned processing (step S18) for all of the disk drive enclosures. According to the storage device 1000 of the embodiment described above, the controller 310 is able to easily identify and manage the disk-drive type even when a mixture of the FC disk drive 220F and SATA disk drive 220S is stored within each disk drive enclosure 200. Therefore, the controller 310 makes use of the characteristics of the FC disk drive 220F and SATA disk drive 220S and control the reading and writing of data. For example, if a disk array device is formed in which disk drives of different types are mixed, the variety of characteristics can be adequately exploited and the weak points can be compensated between the disk drives.

A3. Modified Example (1) This embodiment illustrates processing in which the type of each disk drive 220 is identified by issuing an inquiry to the enclosure management units 241 and 242. Meanwhile, the controller 310 may issue individual type inquiries to each of the disk drives 220. The SCSI 'Modesense' command, for example, can be utilized this processing.

Figure 6:
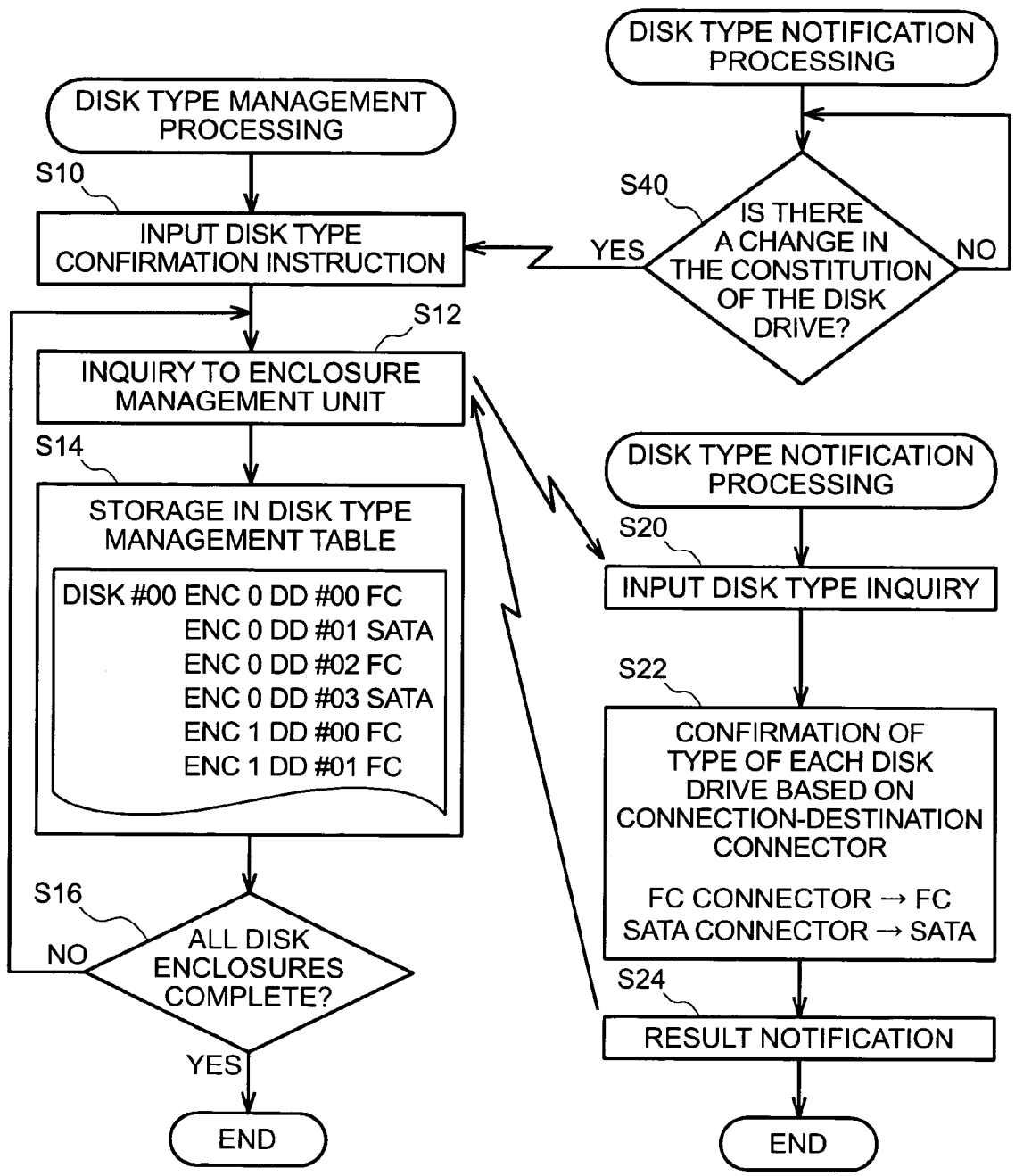
FIG. 6 is a flowchart of the disk-type management processing of a modified example.

(2) FIG. 6 is a flowchart of the disk-type management processing of a modified example. Processing executed by the controller 310 is shown on the left-hand side, while processing executed by the enclosure management units 241 and 242 is shown on the right. In this modified example, the enclosure management units 241 and 242 monitor the internal structure of the disk drive enclosure 200 at fixed intervals. When the constitution of the disk drive 220 changes when the disk drive 220 is withdrawn and is exchanged, and so forth as a result of maintenance or the like, the enclosure management units 241 and 242 output a disk type confirmation instruction to the controller 310 (step S40). The controller 310 then performs the same disk-type management processing (steps S10 to S16) as in the embodiment in accordance with this instruction. In this process, the enclosure management units 241 and 242 report the results (steps S20 to S24) as per the embodiment in response to an inquiry from the controller 310. As a result of the processing of the modified example, there is the advantage that, when the constitution of the disk drive 220 is changed, this change can be rapidly reflected in the disk type management table.

In the modified example in FIG. 6, a case where a confirmation instruction is output by the enclosure management units 241 and 242 to the controller 310 is illustrated. As another modified example, when a change to the constitution of the disk drive is detected, the enclosure management units 241 and 242 may perform the type confirmation of step S22 and the result reporting of step S24 without outputting a confirmation instruction to the controller 310. The controller 310 may store this result report in the disk type management table (step S14). In this case, constitutional changes can be efficiently reflected in the disk type management table for only disk drive enclosures 200 in which the constitution of a disk drive 220 has changed.

Figure 10:
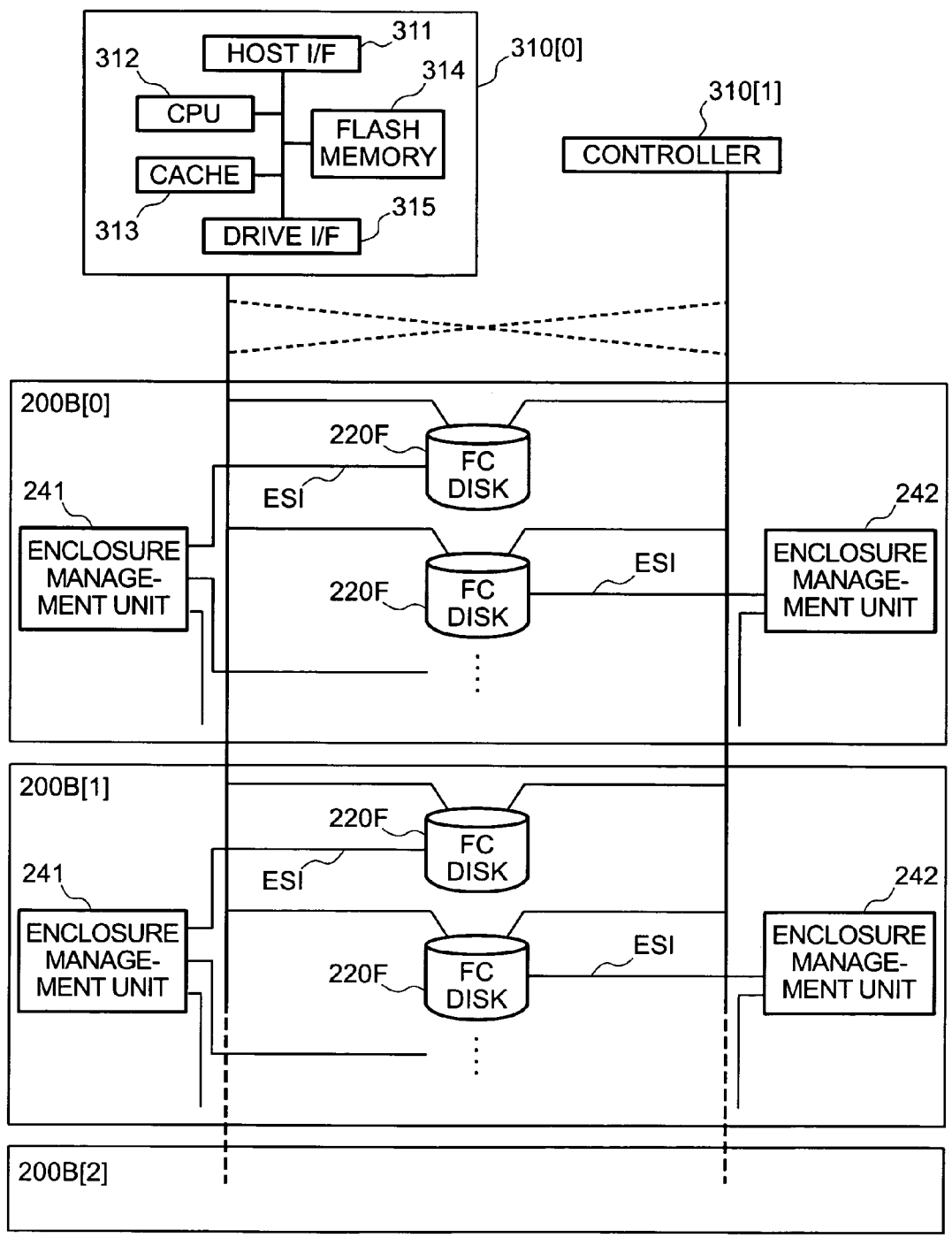
FIG. 10 is an explanatory view that schematically shows the internal structure of a storage device 1000 that is a first modified example of the second embodiment.
Figure 11:
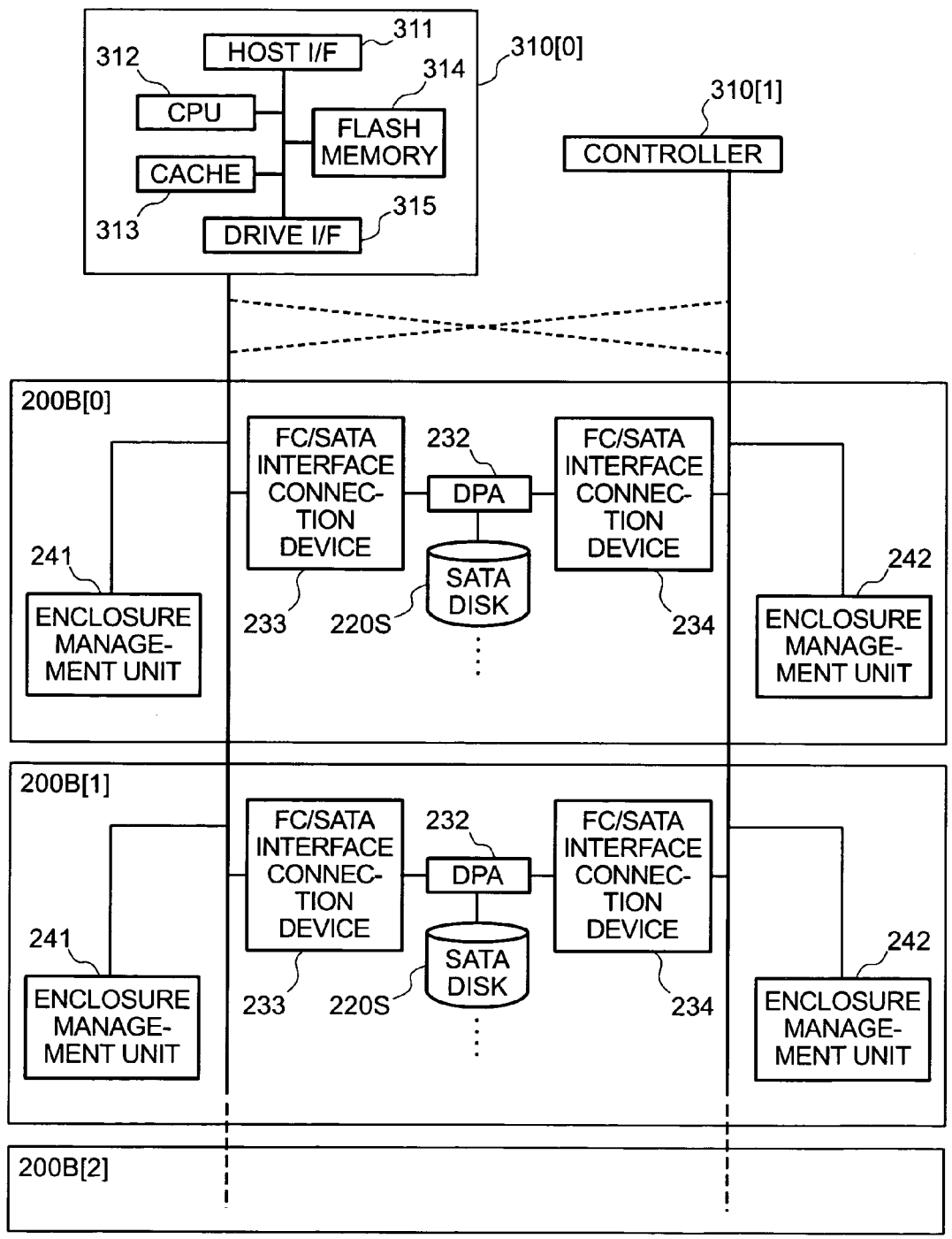
FIG. 11 is an explanatory view that schematically shows the internal structure of a storage device 1000 that is a second modified example of the second embodiment.

With the disk array device that utilizes the disk-type management processing in FIGS. 5 and 6, the user is able to use either an FC disk drive or a SATA disk drive as he or she so wishes. More specifically, the user is able to make proper use of the disk drive in accordance with the data content and application, and so forth, for example. Here, the user is able to render all the disk drives in the disk drive enclosures FC disk drives, as shown in FIG. 10, or render all the disk drives in the disk drive enclosures SATA disk drives, as shown in FIG. 11, for example.

Figure 7:
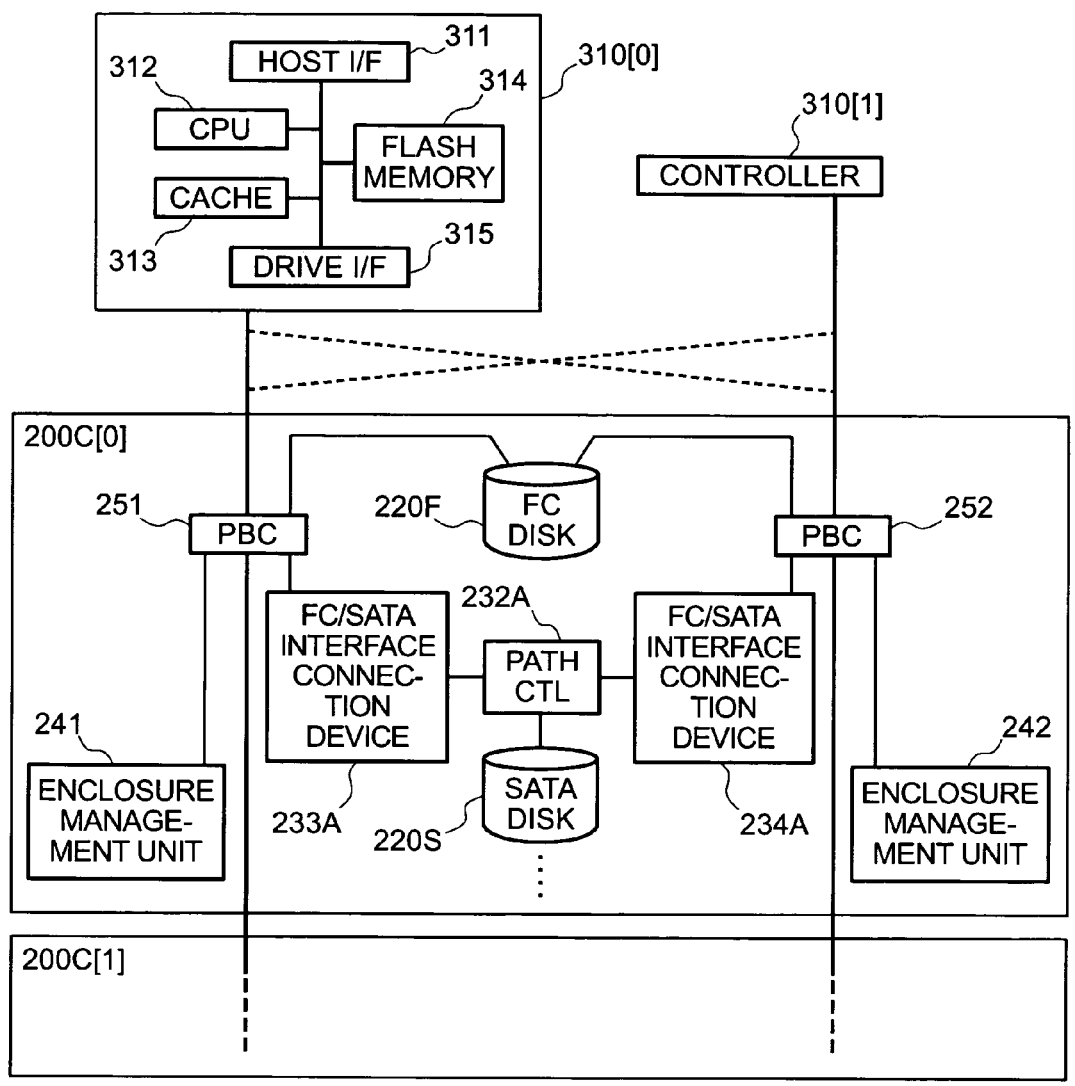
FIG. 7 is an explanatory view that schematically shows the internal structure of a storage device of a first modified example.

(3) FIG. 7 is an explanatory view that schematically shows the internal structure of a storage device of a first modified example. The same reference symbols have been assigned to constituent elements that are the same as those in the embodiment. So too with the storage device of this modified example, a mixture of the FC disk drive 220F and SATA disk drive 220S can be stored in each disk drive enclosure 200.

However, in this modified example, the SATA disk drive 220S is connected to the FC-AL loops via a path CTL 232A and FC/SATA interface connection devices 233A and 234A. The path CTL 232A is a device that artificially renders the SATA disk drive 220S a dual-port disk drive, and contains a switch, which physically switches the connection destination of the SATA disk drive 220S between two lines, and a control circuit for controlling this switch. Although access to the SATA disk drive 220S can be made via either FC-AL loop when the switch is switched, there are limitations, such as that of access being restricted via either FC-AL loop in the event of failure of the switch.

B. Second Embodiment

Figure 8:
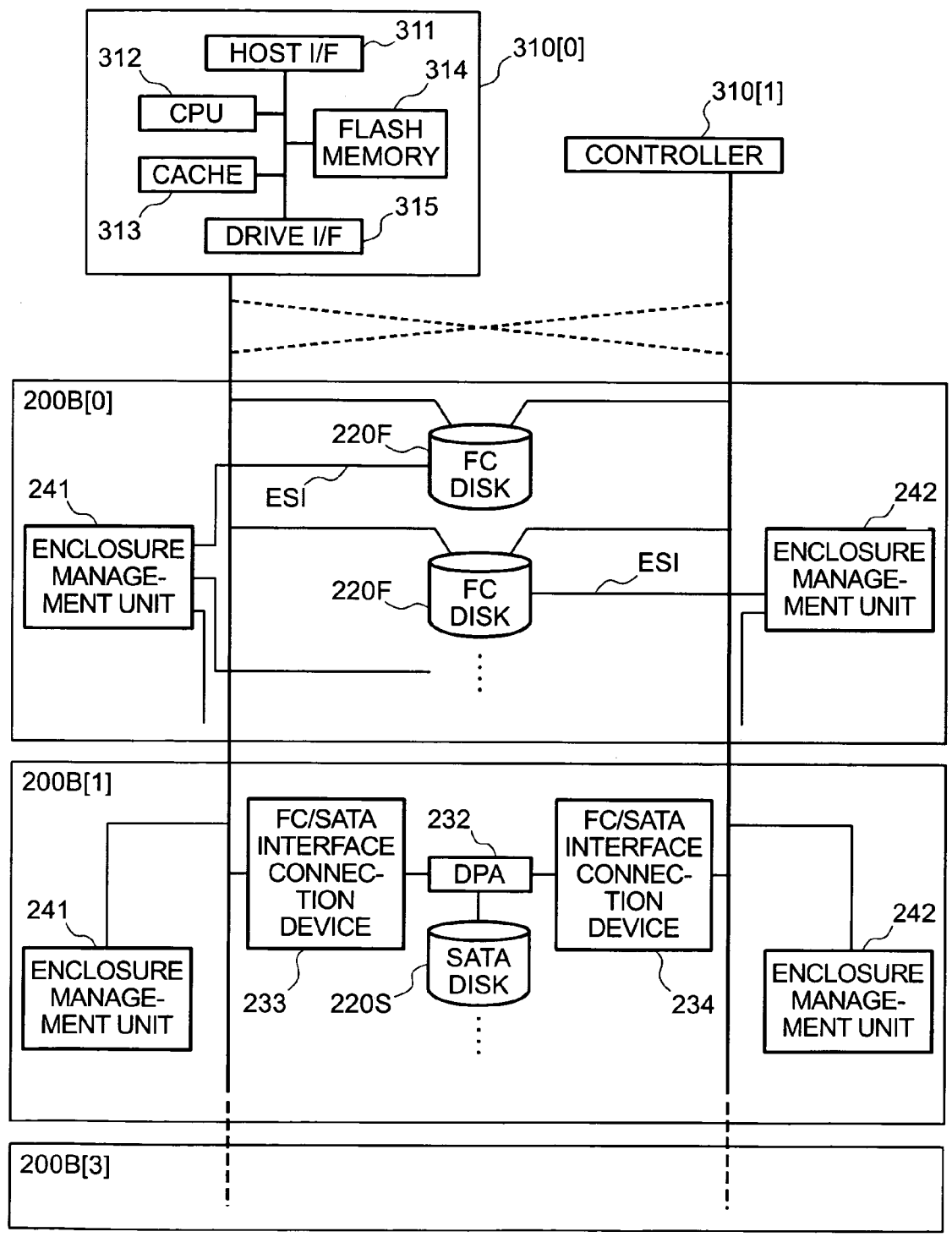
FIG. 8 is an explanatory view that schematically shows the internal structure of a second embodiment of the storage device 1000.

FIG. 8 is an explanatory view that schematically shows the internal structure of a second embodiment of the storage device 1000. In the second embodiment, each disk drive enclosure 200B uniformly stores either the FC disk drive 220F or the SATA disk drive 220S. In the illustrated example, a disk drive enclosure 200B[0] stores the FC disk drive 220F and a disk drive enclosure 200B[1] stores the SATA disk drive 220S.

The FC disk drive 220F is connected to two FC-AL loops. The FC disk drive 220F is connected to the enclosure management units 241 and 242 by means of ESI and possesses a function to transmit an SES command from the enclosure management units 241 and 242.

The SATA disk drive 220S is connected to two FC-AL loops via the DPA 232 and the FC/SATA interface connection devices 233 and 234. The enclosure management units 241 and 242 are also connected to the FC-AL loops. Although omitted from this example, a PBC may be provided. The SATA disk drive 220S may be connected via the path CTL as shown in the modified example of the first embodiment (FIG. 7).

The disk-type management of the second embodiment will now be described. Also in the constitution of the second embodiment, the controller 310 is capable of issuing an inquiry regarding the disk-drive type to the enclosure management units 241 and 242 and each disk drive 220, as per FIGS. 5 and 6 of the first embodiment. In the second embodiment, as detailed below, the type of the disk drive 220 can be ascertained by using an AL-PA (Arbitrated Loop Physical Address) that is allocated to the disk drive 220, in addition to this processing.

Figure 9:
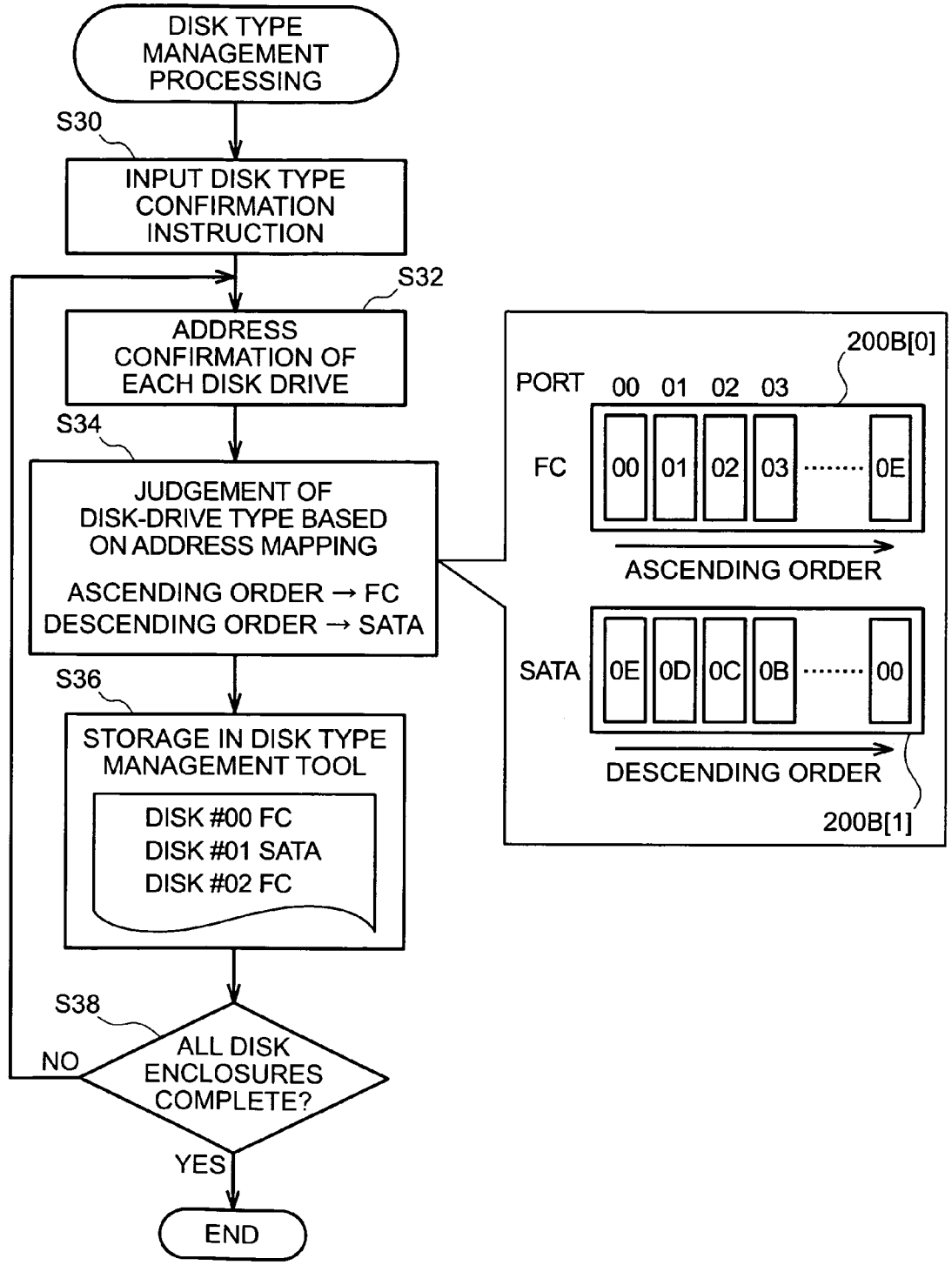
FIG. 9 is a flowchart of disk-type management processing of the second embodiment.

FIG. 9 is a flowchart of disk-type management processing of the second embodiment. The AL-PAs allocated to the disk drives 220 are illustrated on the right-hand side of this figure. Here, values that are different from the real AL-PA are shown to facilitate comprehension. In this embodiment, the relationships between ports and AL-PAs vary for each disk drive enclosure according to the type of disk drive 220. As illustrated in FIG. 9, in the case of the disk drive enclosure 200B[0] stored by the FC disk drive 220F, AL-PA are allocated in ascending order as '00, 01, 02, . . . ' to ports '00, 01, 02, . . . '. In the case of the disk drive enclosure 200B[1] stored by the SATA disk drive 220S, AL-PAs are allocated in descending order as '0E, 0D, 0C, . . . ' to ports '01, 02, 03, . . . '. Conversely, a descending order may be assigned to the FC disk drives 220F and an ascending order to the SATA disk drives 220S. As per the processing indicated below, the controller 310 identifies the type of the disk drive 220 based on these relationships. Judgments based on this approach can be applied irrespective of the values of the AL-PAs.

The processing executed by the controller 310 is shown on the left-hand side of FIG. 9. The controller 310 inputs an a disk type confirmation instruction (step S30), and identifies the address of the disk drive 220 (step S32) for each disk drive enclosure. Then, the controller 310 judges the type of the disk drive 220 (step S34) on the basis of address mapping, that is, of the relationships between the aforementioned ports and AL-PAs. In other words, the type is judged to be 'FC disk drive' when AL-PAs are allocated in ascending order, and judged to be 'SATA disk drive' when the AL-PAs are allocated in descending order.

The controller 310 then stores the judgment results thus obtained in the disk type management table (step S36). The disk type management table is illustrated in this figure. In the second embodiment, disk drive types are standardized for each disk drive enclosure 200. Therefore, the disk type management table can have a simple constitution that associates numbers of disk drive enclosures 200 with types. Instead of this constitution, a table that manages the type for each disk drive may be used as per the first embodiment. The controller 310 is able to identify the type of each disk drive 220 by repeatedly executing the above processing (step S38) for all the disk drive enclosures.

In step S34 of FIG. 9, the type may be judged based on an address range rather than by address mapping. For example, AL-PAs may be allocated to the FC disk drive 220F in the range '00 to 7E' and AL-PAs may be allocated to the SATA disk drive 220S in the range '80 to FE'. The AL-PAs can therefore be used in the type judgment by changing the range of the allocated AL-PAs according to the type of disk drive.

FIG. 10 is an explanatory view that schematically shows the internal structure of a storage device 1000 that is a first modified example of the second embodiment. FIG. 10 corresponds to a state where FC disk drives are mounted in all the disk drive enclosures in the constitution in FIG. 8. FIG. 11 is an explanatory view that schematically shows the internal structure of a storage device 1000 that is a second modified example of the second embodiment. FIG. 11 corresponds to a state where SATA disk drives are mounted in all the disk drive enclosures in the constitution in FIG. 8.

With a disk array device that utilizes the disk-type management processing of FIGS. 5, 6, and 9 described above, the user is able to utilize either FC disk drives or SATA disk drives as he or she so wishes. More specifically, the user is able to make proper use of the disk drive in accordance with the data content, application, and so forth, for example. Here, the user is able to render the disk drives in all the disk drive enclosures FC disk drives, as shown in FIG. 10, or render the disk drives in all the disk drive enclosures SATA disk drives, as shown in FIG. 11, for example.

C. Modified Example

A circuit for connecting a SATA disk drive to the FC-AL loops, and the DPA 232 and FC/SATA interface connection devices 233 and 234 shown in FIG. 4, may be provided in the disk drive enclosure 200. This constitution will now be described as a modified example below.

The constitution of this modified example is based on the fundamental approach that follows.

i) A relay connector is aligned between HDDs of HDD racks and equalizes the dimensional relationships of the connector connecting means, fixing means, and guide means with the main body.

ii) The HDD-rack guide means, which engage with the guide means of the main body, are tapered lengthways and the dimensional relationship is such that the gap prior to complete insertion [of the HDD rack] is small. The main body is provided on the inside with tapered pins, provided with holes that engage with the HDD rack, and the dimensional relationship is such that the gap is small upon complete insertion [of the HDD rack].

iii) Tapered pins are provided in the connector integration substrate of the main body, holes are made in the corresponding HDD rack, and the holes in the HDD rack are plugged by separate parts when no HDD interface is present.

iv) A plurality of points on the side opposite the substrate are pressed with a single touch by pressing three points on the substrate of −1HDD, two points on the longitudinal side face, and one point on either this substrate or side face against narrow reference faces that correspond with rack parts.

v) When −2HDD is integrated, screw holes for screwing and holes corresponding with rack parts are subjected to pullout-method riveting.

Figure 12:
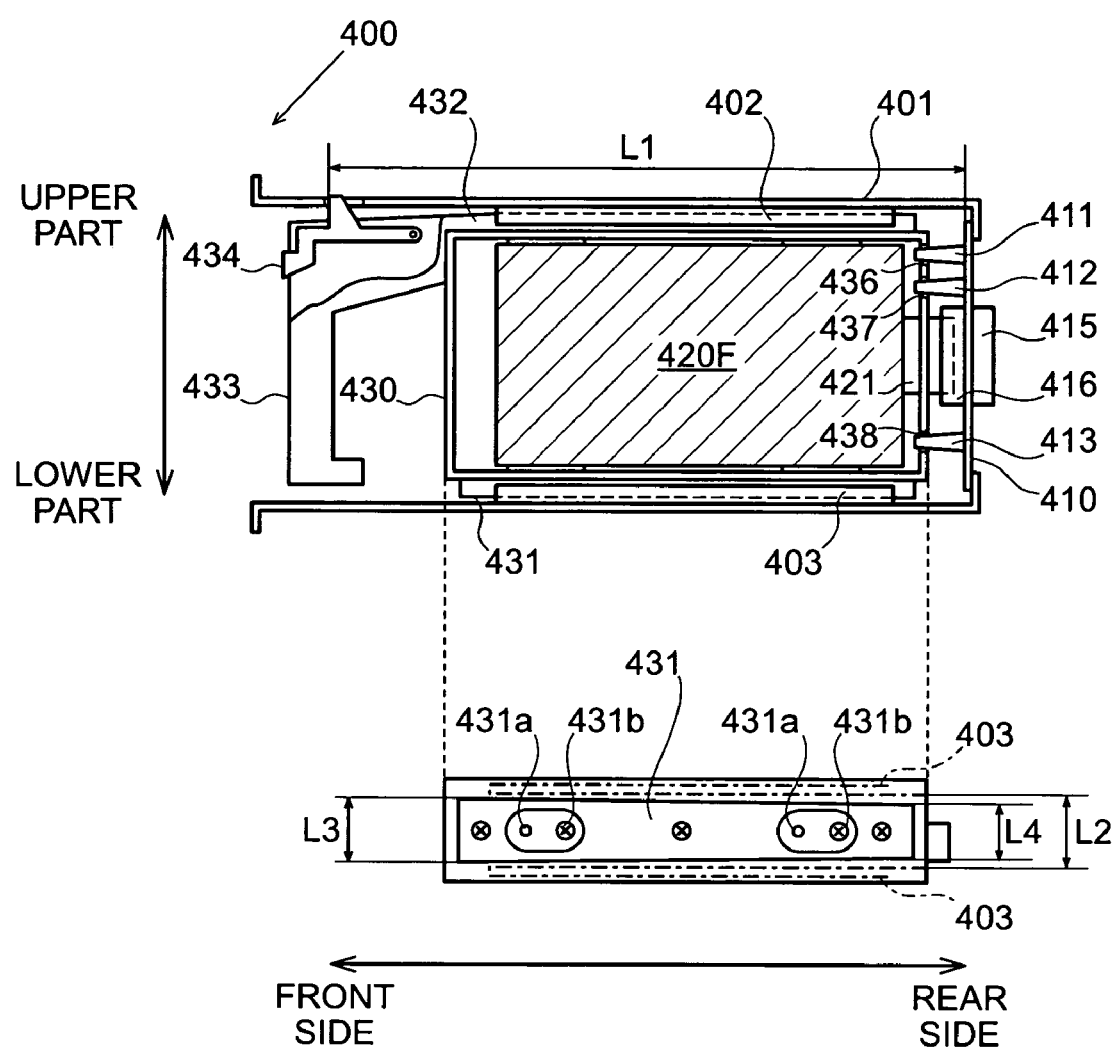
FIG. 12 is an explanatory view that schematically shows the internal structure of a disk drive rack.

FIG. 12 is an explanatory view that schematically shows the internal structure of a disk drive rack and shows a state where an FC disk drive 420F is mounted in a rack 400. The FC disk drive 420F is stored in the disk drive enclosure 200 shown in the embodiment such that this disk drive may be withdrawn when housed in the rack 400.

The main body 401 of the rack 400 takes the form of an empty right-angled parallelepiped with an open front side. Guides 402, 403, which perform an alignment function when the FC disk drive 420F is housed, are provided on the upper and lower sides in a direction running from front to back. In the rear side of the main body 401, a rectangular opening is provided and a substrate 410 is mounted. Connectors 415 and 416 for connecting to the FC disk drive 220F and disk drive enclosure 200 are provided on the substrate 410. Tapered pins 412 and 413, which perform an alignment function, and a tapered pin 411, which serves to prevent the erroneous insertion of a disk drive of a different type, are also provided on the substrate 410.

The FC disk drive 420F is stored within the main-body 401 in a state of being housed in a carrier 430. The method by which the FC disk drive 420F is housed in the carrier 430 will be described subsequently. An opening is provided in the rear side of the carrier 430 in accordance with a connector 421 of the FC disk drive 420F. When the carrier 430 is housed within the main body 401, the connector 421 of the FC disk drive 420F can be connected to the connector 415 on the main body.

Holes 436, 437, and 438, which correspond with the tapered pins 411 to 413, are provided in the rear side of the carrier 430. When the carrier 430 is housed in the main body 401, the tapered pins 411 to 413 are introduced to the respective holes 436 to 438. In this constitution, when appropriately inserted, the size of the tapered pins 411 to 413 is set such that the diameter thereof is approximately 0.3 mm larger than the holes 436 to 438, whereby smooth insertion of the carrier 430 is rendered possible.

A handle 433 for use during insertion is attached to the front side of the carrier 430. A latch 434 for securing the carrier 430 to the main body 401, is provided in the handle 433. When correctly inserted, the carrier 430 is secured as a result of the latch 434 falling into a hole that is provided in a position a distance L1 from the rear face of the main body 401. Rails 431 and 432, which are introduced to the guides 402 and 403 of the main body 401 respectively, are attached to the upper and lower sides of the carrier 430. A state where the carrier 430 is viewed from the lower side is shown at the bottom of the figure. For the sake of convenience in the description, the position of the guide 403 is shown by means of a dot-chain line.

The rear-side width L4 of the rail 431 is about 0.5 mm narrower than the front-side width L3 thereof. The maximum width L3 of the rail 431 is 0.3 mm narrower than the width L2 of the guide 403. That is, these widths are related such that L2>L3>L4. The carrier 430 can be smoothly inserted in the main body 401 because of the narrowing tapered shape of the rear side.

Screw holes 431a and 431b, which serve to mount screws that secure the FC disk drive 420F, are provided in the bottom side of the carrier 430. The provision of two screw holes 431a and 431b close to one another makes it possible for the carrier 430 to be shared by a variety of disk drives. Here, an example is shown where the FC disk drive 420F is secured by means of a screw hole 431b. A countersink, whereby a screw head does not protrude from the rail 431, is provided at the periphery of each screw hole including the screw holes 431a and 431b.

Figure 13:
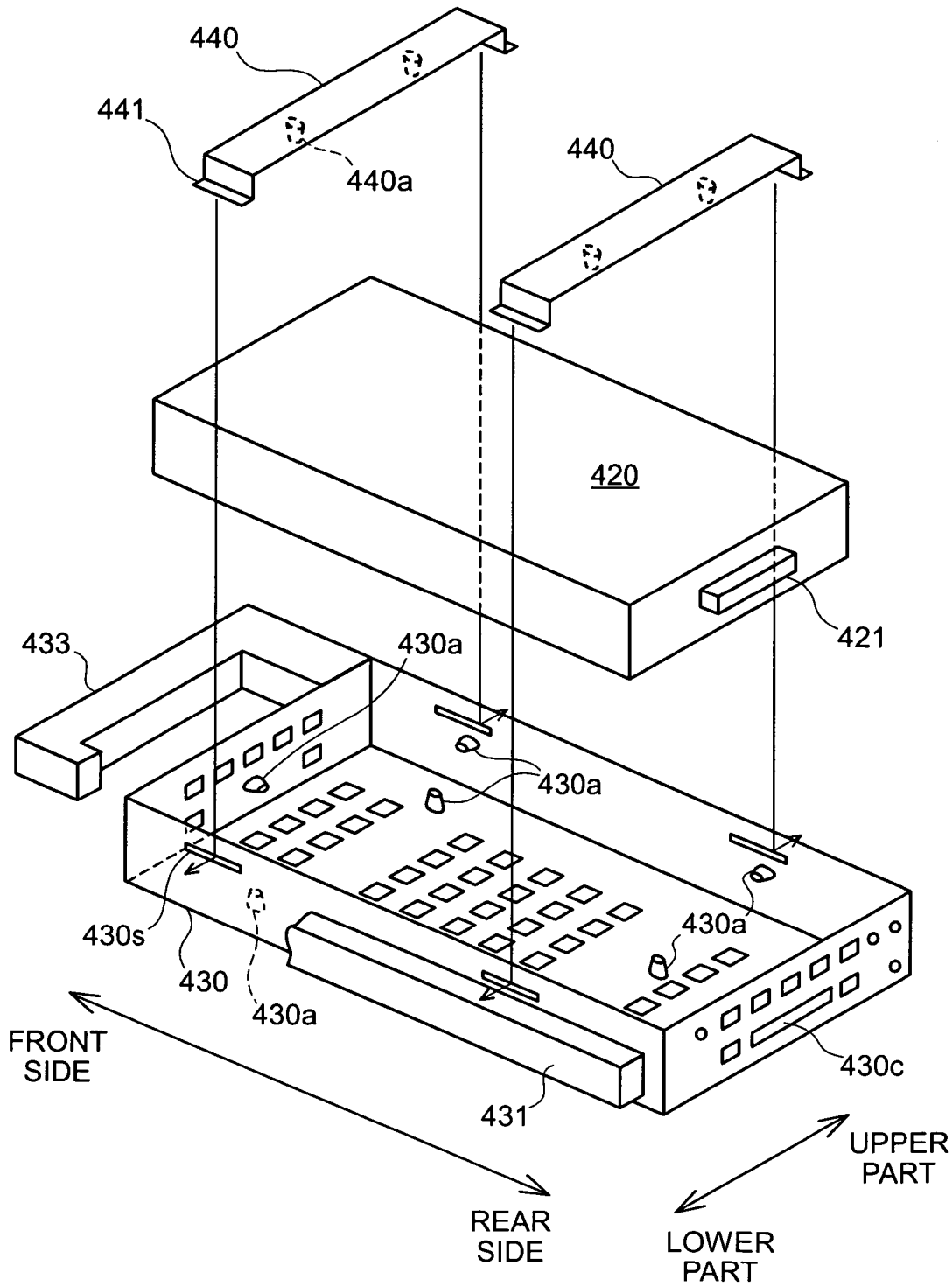
FIG. 13 is a perspective view of the method by which a disk drive 420 is housed within a carrier 430.

FIG. 13 is a perspective view of the method by which a disk drive 420 is housed within the carrier 430. The term 'disk drive 420' is used as a general term for hard disk drives of a variety of interfaces and sizes including the FC disk drive 420F shown in FIG. 12.

Numerous protrusions 430a are provided inside the carrier 430. These protrusions 430a fulfill the function of aligning and supporting the disk drive 420. A connector hole 430c is formed in the rear side of the carrier 430 and the connector 421 is inserted in this connection hole 430c when the disk drive 420 is housed in the carrier 430. The disk drive 420 is supported by two retaining plates 440 so that the disk drive 420 does not drop. The retaining plates 440 are mounted by inserting the ends 441 thereof into slits 430s provided in the upper and lower sides of the carrier 430 respectively. Finally, the retaining plates 440 are secured by means of screws via the screw holes 431a and 431b shown in FIG. 12 earlier. However, the screw holes 431a and 431b are not illustrated here for the sake of avoiding a complicated illustration.

Figure 14:
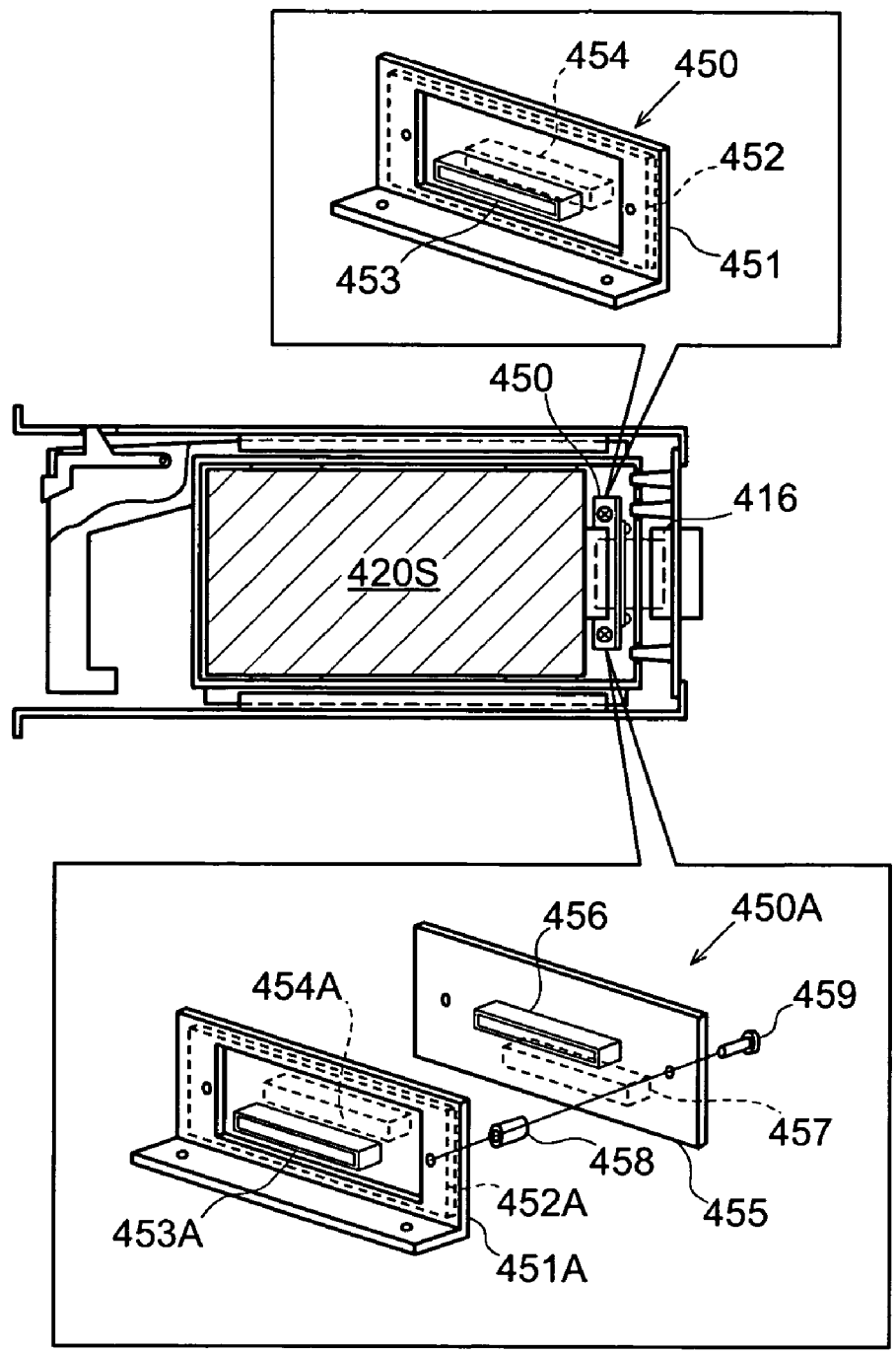
FIG. 14 is an explanatory view of the housed state of a SATA disk drive 420S.

FIG. 14 is an explanatory view of the housed state of a SATA disk drive 420S. The internal structure of the SATA disk drive 420S when same is housed in a rack is shown schematically in the middle of FIG. 14. The structure of the carrier and the main body of the rack, and so forth, are also common to the disk drive rack shown in FIG. 12. In this embodiment, a case where the connector positions differ between the FC disk drive and SATA disk drive is illustrated (see FIG. 3), but these connector positions match one another here. As shown in the figure, the SATA disk drive 420S is connected to the connector 416 via an adapter 450.

A perspective view of the adaptor 450 is shown at the top of the figure. The main body 451 of the adaptor 450 has a substantially L-shaped cross-section and a substrate 452 is mounted in an opening close to the center of the main body 451. A connector 453, which forms a connection with the SATA disk drive 420S, and a connector 454, which forms a connection with the rack, are provided on the front and rear sides of the substrate 452 respectively. Although omitted from the illustration, a variety of circuits, which serve to connect the SATA disk drive 420S to the FC-AL loops, are provided on the substrate 452, between these connectors 453 and 454. These circuits may include the DPA 232 and FC/SATA interface connection devices 233 and 234 shown in FIG. 4 and the path CTL 232A shown in FIG. 7, for example.

A perspective view of an adapter 450A, which constitutes a modified example, is shown at the bottom of the figure. The adaptor 450A of this modified example is constituted by principal parts that comprise a main body 451A, a substrate 452A, and connectors 453A and 454A, and a sub-substrate 455. A connector 456, which corresponds with the connector 454A, and a connector 457, which forms a connection with the rack, are provided on the sub-substrate 455. Both these substrates are secured by screws 459 so that a fixed gap is secured with a spacer 458 interposed therebetween. With this structure, it is possible to arrange a variety of circuits for connecting the SATA disk drive 420S to the FC-AL loops by using this gap.

Because the SATA disk drive 420S is housed in the rack by using the adapter 450 or adapter 450A, the external dimensions and interface of the rack can be standardized and the rack can be handled without distinguishing between the FC disk drive and SATA disk drive. Hence, the position in which the rack is stored in the disk drive enclosure 200, and so forth, can be changed flexibly and disk drives of different types can be operated more efficiently.

Here, a case where the adaptor 450 is attached to the SATA disk drive 420S is illustrated, but the adaptor 450 may be attached to the connector 416 of the rack. In such a case, the constitution of the rack differs between one for an FC disk drive and one for a SATA disk drive. In this case, a mechanism, which prevents the SATA disk drive 420S from being inserted in error, is preferably provided in the rack for the FC disk drive.

Figure 15:
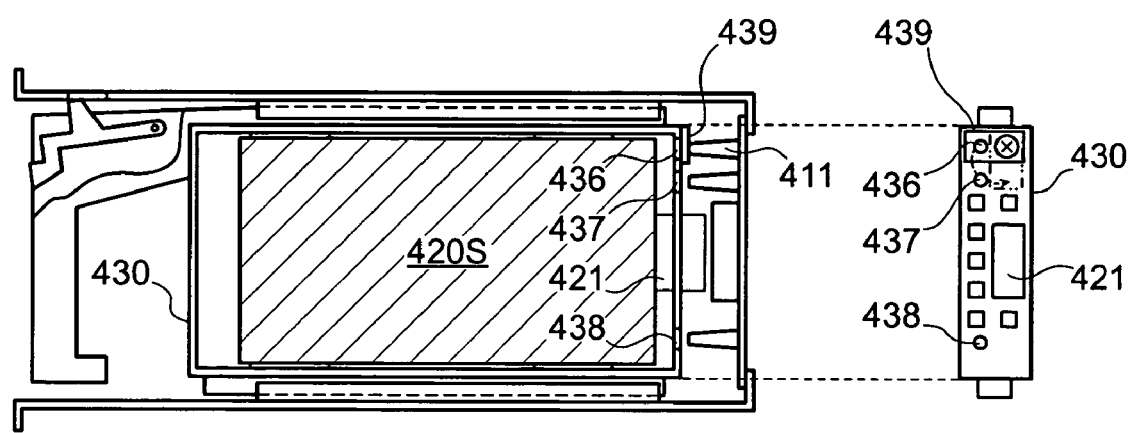
FIG. 15 is an explanatory view of the erroneous insertion prevention mechanism.

FIG. 15 is an explanatory view of the erroneous insertion prevention mechanism. A case where the SATA disk drive 420S has been inserted in error in the FC-disk-drive rack is illustrated. The cross-section of the side of the rack is shown on the left-hand side of the figure, while a state in which the carrier 430 is viewed from the rear is shown on the right-hand side.

The pin 411 for preventing erroneous insertion, and the alignment pins 412 and 413 are provided in the rack as described earlier. Holes 436 to 438, which correspond with the pins 411 to 413, are provided in the carrier 430. In this example, a base 439, which is capable of turning in the direction of the arrow in the figure, is further provided in a position that corresponds with the hole 436, as the erroneous insertion prevention mechanism. By setting the base 439 in the position of the solid lines in the figure, that is, in a position to plug the hole 436, the pin 411 prevents the carrier 430 from being mounted in the rack. If the base 439 is turned to enter a state where the hole 436 is then visible, the pin 411 can be inserted in the hole 436 and the carrier 430 can be mounted in the rack. The erroneous mounting of a disk drive in the rack can be easily avoided by using such a constitution.

According to the structure of the modified example described above, the circuits of the disk drive enclosure 200 are standardized for usage by the FC disk drive and permit storage of disk drives of different types. The modified example illustrates a case where the disk drive 420 is housed in the rack 400 before being stored within the disk drive enclosure 200. However, if the adaptor 450 can be mounted in the SATA disk drive 420S, the rack 400 need not necessarily used.

The following facts may be presented as effects provided by the structure of the modified example.

i) The HDD rack constituent parts can be adopted and standardized for different HDD carriers, whereby an initial-cost reduction can be achieved.

ii) Smooth mounting and dismounting of a HDD rack is possible, whereby time reductions are achievable.

iii) HDD rack erroneous insertion prevention is feasible.

iv) Work efficiency can be improved because the −1HDD is pressed into the rack with a single touch.

v) When −2HDD is integrated, work efficiency can be improved by subjecting screw holes for screwing and holes corresponding with rack parts to pull-out method riveting.

A variety of embodiments of the present invention were described above. However, it is understood that the present invention is not limited to or by these embodiments and that a variety of constitutions can instead be adopted within a scope that does not depart from the spirit of the present invention.

What is claimed is:

1. A disk array device, comprising:
    a disk array device enclosure;
    a plurality of disk drives stored in the disk array device enclosure;
    a controller, which controls the reading and writing of data from and to the disk drives; and
    a fiber channel cable connecting the disk drives and the controller,
    wherein:
    the disk drives include two types of disk drive, which are a fiber channel disk drive with a fiber channel interface, and a serial disk drive with a serial interface;
    the serial disk drive is connected to the fiber channel cable via an interface connection device that converts the serial interface to a fiber channel interface; and
    the controller discriminates the type of each of the disk drives by communicating via the fiber channel cable.

2. The disk array device according to claim 1, further comprising:
    a plurality of the controller, the controllers being mutually connected by means of the fiber channel cable and connected to each of the disk drives individually to form a plurality of fiber channel loops; and
    a switch, which is interposed between each serial disk drive and the plurality of fiber channel cables and switches the connection destination of the serial disk drive between the plurality of fiber channel cables.

3. The disk array device according to claim 1, further comprising:
    a plurality of disk drive enclosures that stores the plurality of disk drives for each of the disk-drive types,
    wherein:
    each of the disk drive enclosures for storing the serial disk drive comprises a management unit for managing the operating state of each stored disk drive; and
    the controller discriminates the type by communicating with the management unit.

4. The disk array device according to claim 1, further comprising:
    a plurality of disk drive enclosures, which stores the plurality of disk drives for each of the disk-drive types and allocates an address to each of the disk drives according to a certain rule corresponding with the type,
    wherein:
    the controller discriminates the type on the basis of the address allocated to each of the disk drives within the disk drive enclosure.

5. The disk array device according to claim 4, wherein:
    the address space allocated to the disk drive varies according to the type; and
    the controller performs the discrimination on the basis of the address-space difference.

6. The disk array device according to claim 4, wherein:
    the relationship between the location of the disk drive within the disk drive enclosure and the address allocated to each of the disk drives varies in accordance with the type; and
    the controller performs the discrimination on the basis of this relationship.

7. The disk array device according to claim 1, further comprising:
    a backboard on which a plurality of connectors for connecting the plurality of disk drives is arranged,
    wherein:
    the plurality of connectors is a mixture of connectors for which at least one of the position and shape differ(s) according to the type of disk drive; and
    the controller discriminates the type on the basis of the connector to which the disk drive is connected.

8. The disk array device according to claim 7, wherein:
    the interface connection device is connected to the connector to which the serial disk drive is to be connected on the backboard.

9. The disk array device according to claim 7, further comprising:
    a plurality of disk drive enclosures for storing the plurality of disk drives via the backboard,
    wherein:
    the type of the stored disk drive is standardized for each of the disk drive enclosures; and
    the controller performs the discrimination for each of the disk drive enclosures on the basis of the connector to which at least one disk drive is connected.

10. The disk array device according to claim 7, further comprising:
    a plurality of disk drive enclosures that store the plurality of disk drives via the backboard,
    wherein:
    a mixture of the disk drives of the plurality of types can be stored in the disk drive enclosure; and
    the controller performs the discrimination for each of the disk drives on the basis of the connector to which the disk drive is connected.

11. The disk array device according to claim 1, further comprising:
    a plurality of racks for housing each of the disk drives,
    wherein:
    the plurality of racks have standardized external dimensions; and
    the rack for storing the serial disk drive contains the interface connection device.

12. The disk array device according to claim 11, wherein:
    the disk drive comprises at least one of: position-regulating holes provided in uniform positions irrespective of the disk-drive type and erroneous-insertion-preventing holes provided in only one of the fiber channel disk drive and serial disk drive; and
    the rack contains at least one of: tapered position-regulating pins provided in correspondence with the position-regulating holes and pins provided in correspondence with the erroneous-insertion-preventing holes.

13. A management method according to which, in a disk array device in which a plurality of disk drives and a controller for controlling the reading and writing of data from and to the disk drives are stored in a disk array device enclosure so as to be connected via a fiber channel cable, the controller manages the disk drives, which include two types of disk drive which are a fiber channel disk drive with a fiber channel interface and a serial disk drive with a serial interface, and the serial disk drive is connected to the fiber channel cable via an interface connection device that converts the serial interface to a fiber channel interface,
    the management method comprising:
    a step in which the controller communicates directly or indirectly with at least some of the disk drives via the fiber channel cable; and a step of discriminating the type of each of the disk drives on the basis of this communication.

14. The management method according to claim 13, wherein the disk array device comprises:
a plurality of the controller, the controllers being mutually connected by means of the fiber channel cable and connected to each of the disk drives individually to form a plurality of fiber channel loops; and
a switch, which is interposed between each serial disk drive and the plurality of fiber channel cables and switches the connection destination of the serial disk drive between the plurality of fiber channel cables; and
the controllers perform the discrimination individually.

15. The management method according to claim 13, further comprising:
a plurality of disk drive enclosures that stores the plurality of disk drives for each of the disk-drive types,
wherein:
each of the disk drive enclosures for storing the serial disk drive comprises a management unit for managing the operating state of each stored disk drive; and
the controller discriminates the type by communicating with the management unit.

16. The management method according to claim 13, further comprising:
a plurality of disk drive enclosures, which stores the plurality of disk drives for each of the disk-drive types and allocates an address to each of the disk drives according to a certain rule corresponding with the type,
wherein:
the controller discriminates the type on the basis of the address allocated to each of the disk drives within the disk drive enclosure.

17. The management method according to claim 16, wherein:
the address space allocated to the disk drive varies according to the type; and
the controller performs the discrimination on the basis of the address-space difference.

18. The management method according to claim 16, wherein:
the relationship between the location of the disk drive within the disk drive enclosure and the address allocated to each of the disk drives varies in accordance with the type; and
the controller performs the discrimination on the basis of this relationship.

19. The management method according to claim 13, further comprising:
a backboard on which a plurality of connectors for connecting the plurality of disk drives is arranged,
wherein:
the plurality of connectors is a mixture of connectors for which at least one of the position and shape differ(s) according to the type of disk drive; and
the controller discriminates the type on the basis of the connector to which the disk drive is connected.

20. The management method according to claim 19, further comprising:
a plurality of disk drive enclosures for storing the plurality of disk drives via the backboard,
wherein:
the type of the stored disk drive is standardized for each of the disk drive enclosures; and
the controller performs the discrimination for each of the disk drive enclosures on the basis of the connector to which at least one disk drive is connected.

21. The management method according to claim 19, further comprising:
a plurality of disk drive enclosures that store the plurality of disk drives via the backboard,
wherein:
a mixture of the disk drives of the plurality of types can be stored in the disk drive enclosure; and
the controller performs the discrimination for each of the disk drives on the basis of the connector to which the disk drive is connected.

22. A disk array device, comprising:
a controller enclosure that comprises: a communication control unit that is connected to a host device and receives data from the host device; cache memory that is connected to the communication control unit and stores data exchanged between the communication control unit and the host device; a plurality of controllers that is connected to the host device and the cache memory and performs control so that data exchanged between the host device and the cache memory is transferred to the communication control unit or received from the communication control unit; information storage memory that saves information managed by the plurality of controllers; and a plurality of drive interfaces that transfers data, which is received by the host device, under the control of the plurality of controllers; and
a serial disk drive enclosure that comprises: a plurality of fiber channel loops connected to the plurality of drive interfaces in the controller enclosure; a plurality of switching circuits that is connected to the plurality of fiber channel loops and that is used to switch the connection between the controller enclosure and the serial disk drive enclosure; a plurality of interface connection devices that is connected to the plurality of controllers by means of the plurality of fiber channel loops and that is connected to a fiber channel interface used by the plurality of fiber channel loops and to a serial disk drive interface; a plurality of dual-port switching devices that is connected to the plurality of interface connection devices and that controls switching to receive data from the plurality of interface connection devices; a plurality of serial disk drives that is connected to the plurality of dual-port switching devices and that stores data transferred by means of the drive interface by receiving this data via the fiber channel loops, the switching circuits, the interface connection devices and the dual-port switching devices; and an enclosure management processor that monitors the operation of the interface connection devices,
wherein:
the plurality of interface connection devices collects information on the disk drive connected to the serial disk drive enclosure; judges whether the disk drive connected to the serial disk drive enclosure is a serial disk drive; and, when the disk drive connected to the serial disk drive enclosure is a serial disk drive, reports the fact that the disk drive connected to the serial disk drive enclosure is a serial disk drive to the controller by using the fiber channel loops; and
the controller registers the fact that the disk drive connected to the serial disk drive enclosure is a serial disk drive in the memory and manages the disk drive connected to the serial disk drive enclosure as a serial disk drive.

* * * * *